UNITED STATES PATENT OFFICE.

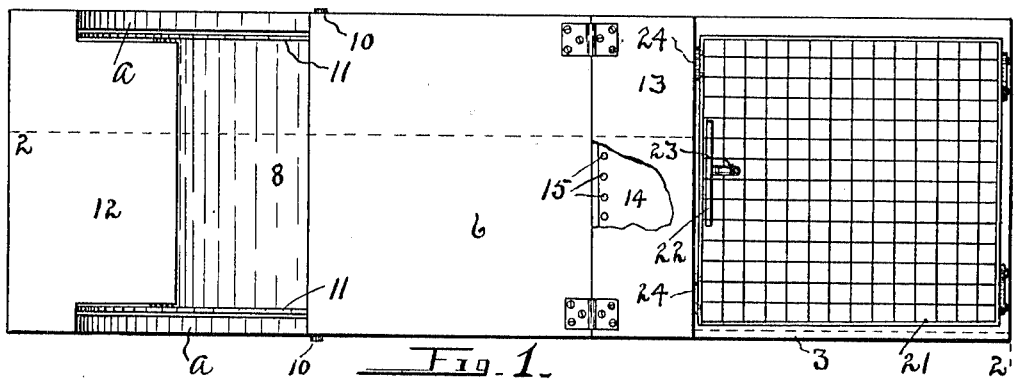
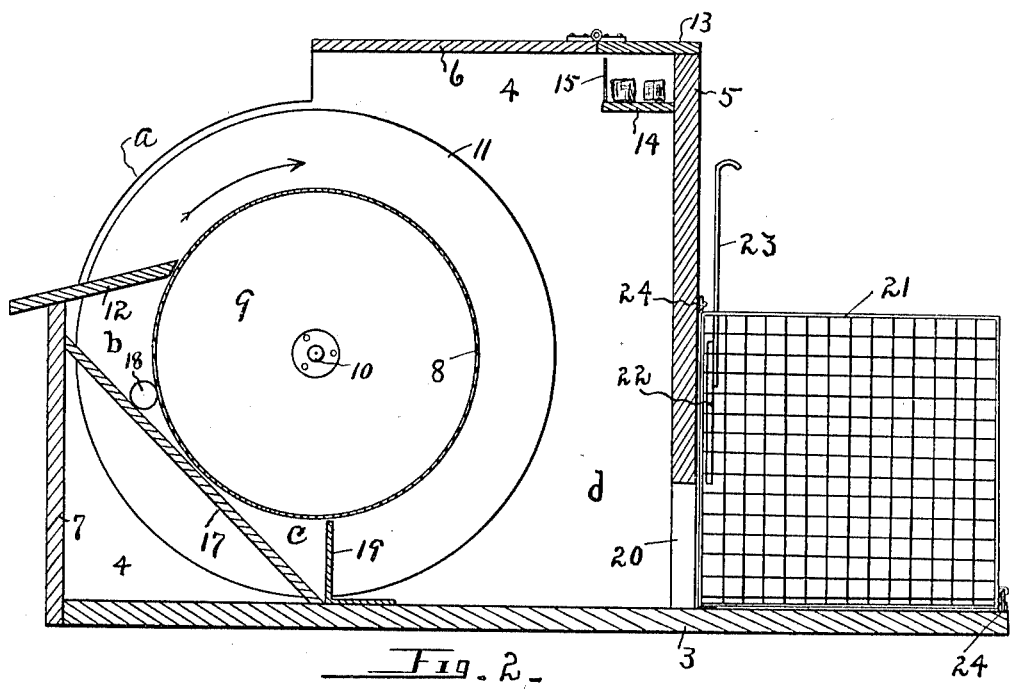

ISAAC B. KISSELL, OF COUNCIL BLUFFS, IOWA.

ANIMAL-TRAP.

1,063,976. Specification of Letters Patent. Patented June 10, 1913.

Application filed September 30, 1912. Serial No. 723,096.

*To all whom it may concern:*

Be it known that I, ISAAC B. KISSELL, a citizen of the United States, residing at Council Bluffs, in the county of Pottawattamie and State of Iowa, have invented certain new and useful Improvements in Animal-Traps, of which the following is a specification.

This invention relates to an improved animal trap, found to be particularly useful for trapping rats, and has for its object, broadly, to provide a construction consisting of few and simple parts, so that manufacture may be economical, and durability will be attained.

The invention has reference to a construction by means of which the practice of trapping and exterminating rats or other rodents may be attended by more than ordinary sanitary conditions.

It also has reference to a construction and combination of parts which will be reliable in operation, and consists, briefly, in the employment of a box having an open entrance way, a horizontal drum providing a floor for the entrance way, the drum to be rotated in one direction by the weight of the animal while entering the trap, said drum operating as a barrier to prevent an escape; a rotation of the drum in the opposite direction being prevented by a wedge or roller-member adapted to bear upon the periphery of the drum.

With the objects in view as outlined and others to be mentioned, the invention consists of the novel construction, combination and arrangement of parts as described herein and claimed, and as illustrated in the accompanying drawing, wherein,—

Figure 1 is a plan view, partly broken, of an animal trap illustrating one embodiment of my invention. Fig. 2 is a sectional view on the irregular line 2 2 of Fig. 1.

Referring now to the drawing for a more particular description, the device consists, in part, of a rectangular box or casing made of any suitable material, and preferably including a bottom 3, ends 4, a back 5, a plate or top member 6 and a front part 7. A cylinder or drum 8 is employed and preferably is made of sheet metal, its ends being indicated at 9, said ends being provided with trunnions 10 for bearings in the ends 4; and as shown in the drawing, the ends 9 have a greater diameter than that of the drum to provide the annular flanges 11, said flanges being disposed adjacent to the ends 4.

At 12 is indicated a platform disposed between flanges 10. It projects outwardly of and is supported by the front part 7 to which it is secured by any suitable means, and it is inclined upwardly therefrom to terminate adjacent to and above a part of the drum, the inner terminal of the platform having a straight edge disposed substantially parallel with the axis of said drum; and as thus described, the platform conjointly with a part of the periphery of the drum, provides the floor of an open entrance way to the box or casing.

The top consists, in part, of a door 13 adapted to be opened outwardly near the back 5. Within the casing below this door, and to the rear of the drum, is provided a shelf or ledge 14, upon which may be deposited a suitable bait, said shelf preferably being provided, near its front edge, with numerous upright pins or bars 15, to prevent dislodgment of the bait.

As clearly shown in the drawing, the top member 6 has a less width than the casing, and the upper parts of ends 4 may be incised to form the segmental edges *a* adjacent to the perimeter of flanges 10, these segmental edges extending from the platform rearwardly to a point directly above the middle of the drum, and defining the side limits of the entrance way within the casing or trap.

Disposed between the ends 4 of the casing and parallel with the axis of the drum is indicated a partition 17. It is disposed inclinedly, its lower edge being suitably secured to the bottom 3, its upper edge being secured to the front wall 7. It is disposed near the periphery of the drum and provides, between its side wall and said drum, an upwardly-divergent containing-space or compartment *b* in which may be loosely disposed a ball, compressor or roller-member 18, preferably constructed of cork or similar material; and by reason of gravity, the roller will normally make contact with the drum and said partition.

In operation, the drum will not rotate forwardly when the animal, attracted by the bait, moves in the direction of the arrow, upon and toward the top of the drum, since the roller will be compressed between the periphery of the drum and partition 17. The bearings of the drum are such that it may rotate rearwardly without any appreciable friction, and when the animal approaches near to the bait by moving upon the drum from platform 12, the weight of said animal being "past the center" or upon the rear part of the drum, a rearward rotatable movement of said drum will immediately occur to cause the animal to pass or fall rearwardly and downwardly within the trap.

It will be noted that the construction is such that the bait, while apparently available, may not be disturbed, this being on account of the particular location of the shelf to the rear of the drum, and to the provision of the pins which guard the bait; and partly for this reason a large number of animals may be trapped very quickly and in succession; also the operation of the parts, as described, is such that violence or injury will not be inflicted while an animal is being entrapped, such violence generally tending to drive away other animals at the outside of the trap.

By reason of the inclination of partition 17, a downwardly-divergent recess c is formed; and in order that this recess will not open upon the rear or main part of the casing, and to prevent any substance or obstruction from becoming "wedged" or caught within this recess by the rearward rotation of the drum, an upright partition 19 is employed, said partition having a width less than the width of flanges 10, and disposed between these flanges, while mounted upon the bottom 3.

At 20 is indicated an open way communicating with the main compartment d and any suitable cage 21. This cage may be disposed upon the rearward extension of bottom 3, and may be provided with a slide door 22 having a handle 23; and by use of hooks 24, the cage may be connected with or disconnected from the casing.

Flanges 11 of the drum may be dispensed with in instances where the ends 4 of the casing are constructed of sheet metal. The purpose of the flanges as shown is to prevent an escape of the animal by climbing upwardly, especially when the ends 4 are constructed of wood. The casing and cage may have any suitable size or proportion, depending upon its uses. The drum may have a comparatively large diameter since its mounting is such that it may rotate in one direction without any appreciable friction. Since the drum has a smooth surface, an escape cannot be made by climbing thereon from the interior of the casing.

Having fully described my invention, what I claim and desire to secure by Letters Patent is,—

1. An animal trap, comprising, in combination with a box formed with an open entrance way; a platform supported by and projecting inwardly of the box to provide a part of the floor of the entrance way; a drum mounted for rotation within the box, said drum being disposed with a part of its periphery adjacent to and with its axis substantially parallel with said platform; an inclinedly-disposed partition arranged below the platform to form, in conjunction with the periphery of the drum, an upwardly-divergent compartment; and a roller-member disposed loosely within said upwardly-divergent compartment to prevent a rotatable movement of said drum in one direction.

2. An animal trap, comprising, in combination with a box formed with an open entrance way; a drum mounted for rotation within the box; a platform having a straight edge disposed parallel with the axis, adjacent to and above the periphery of the drum, said platform projecting outwardly of the box to form, in conjunction with the periphery of the drum, a floor for said entrance way; an inclinedly disposed partition below the platform to form, in conjunction with the periphery of the drum, an upwardly-convergent compartment; and a roller-member disposed loosely within said upwardly-convergent compartment to prevent a rotatable movement of the drum in one direction.

3. An animal trap, comprising, in combination with a rectangular casing formed with an entrance way between its upright ends; a drum formed with terminal, annular flanges projecting outwardly of its periphery, said drum being disposed within the casing with its flanges disposed adjacent to the upright ends of the casing, the periphery of said drum providing a movable floor for said entrance way.

4. An animal trap, comprising, in combination with a rectangular casing formed with an entrance way between its upright ends; a drum formed with terminal, annular flanges projecting outwardly of its periphery, said drum being mounted rotatably within the casing with its flanges disposed adjacent to the upright ends of the casing to provide a floor for said entrance way; and means to prevent a rotatable movement, in one direction, of said drum.

5. An animal trap, comprising, in combination with a rectangular casing formed with an entrance way between its upright ends; a drum adapted to be rotated in one direction and provided with terminal, annular flanges projecting outwardly from its periphery, said drum being disposed within the casing with its terminal flanges parallel with and adjacent to the upright ends of the casing; a platform disposed between the flanges of the drum while supported by the casing, the periphery of the drum in conjunction with the platform forming a floor for said entrance way.

In testimony whereof I have affixed my signature in presence of two witnesses.

ISAAC B. KISSELL.

Witnesses:
A. F. CLARK,
HIRAM A. STURGES.